(12) United States Patent
Graziano et al.

(10) Patent No.: US 8,924,654 B1
(45) Date of Patent: Dec. 30, 2014

(54) MULTISTREAMED PROCESSOR VECTOR PACKING METHOD AND APPARATUS

(75) Inventors: Vincent J. Graziano, St. Paul, MN (US); James R. Kohn, Inver Grove Heights, MN (US)

(73) Assignee: Cray Inc., Seattle, WA (US)

( * ) Notice: Subject to any disclaimer, the term of this patent is extended or adjusted under 35 U.S.C. 154(b) by 1035 days.

(21) Appl. No.: 10/643,744

(22) Filed: Aug. 18, 2003

(51) Int. Cl.
*G06F 12/00* (2006.01)
*G06F 13/00* (2006.01)
*G06F 13/28* (2006.01)

(52) U.S. Cl.
USPC .......................................................... 711/147

(58) Field of Classification Search
CPC .................................................. G06F 3/0482
USPC ......................................................... 711/147
See application file for complete search history.

(56) References Cited

U.S. PATENT DOCUMENTS

| | | | | |
|---|---|---|---|---|
| 4,787,057 A | * | 11/1988 | Hammond | 708/607 |
| 4,870,568 A | * | 9/1989 | Kahle et al. | 707/5 |
| 4,891,751 A | * | 1/1990 | Call et al. | 712/6 |
| 5,197,130 A | * | 3/1993 | Chen et al. | 712/3 |
| 5,418,973 A | * | 5/1995 | Ellis et al. | 712/3 |
| 5,475,849 A | * | 12/1995 | Ando et al. | 712/6 |
| 5,721,928 A | * | 2/1998 | Umehara et al. | 717/149 |
| 5,732,156 A | * | 3/1998 | Watanabe et al. | 382/239 |
| 5,943,096 A | * | 8/1999 | Choo | 375/240.16 |
| 6,012,135 A | * | 1/2000 | Leedom et al. | 711/208 |
| 6,138,115 A | * | 10/2000 | Agrawal et al. | 707/3 |
| 6,138,123 A | * | 10/2000 | Rathbun | 707/201 |
| 6,182,061 B1 | * | 1/2001 | Matsuzawa et al. | 707/2 |
| 6,466,946 B1 | * | 10/2002 | Mishra et al. | 707/102 |
| 6,496,902 B1 | * | 12/2002 | Faanes et al. | 711/118 |
| 6,516,325 B1 | * | 2/2003 | Blanchard et al. | 707/104.1 |
| 6,694,064 B1 | * | 2/2004 | Benkelman | 382/284 |
| 2003/0163297 A1 | * | 8/2003 | Khaira et al. | 703/15 |
| 2003/0182376 A1 | * | 9/2003 | Smith | 709/205 |
| 2003/0195938 A1 | * | 10/2003 | Howard et al. | 709/208 |
| 2004/0003022 A1 | * | 1/2004 | Garrison et al. | 709/105 |
| 2004/0193837 A1 | * | 9/2004 | Devaney et al. | 712/3 |

\* cited by examiner

*Primary Examiner* — Sheng-Jen Tsai
(74) *Attorney, Agent, or Firm* — Craig J. Lervick; Larkin Hoffman Daly & Lindgren, Ltd.

(57) ABSTRACT

A computerized method, apparatus, and executable instructions on a machine readable medium for using multiple processors in parallel to create a pack vector from an array in memory. In some embodiments creating the pack vector includes reading portions of the array into a plurality of processors that each select a subset of elements from the their respective portions of the array based on a predetermined criteria. Some embodiments further include counting each of the selected subsets of elements and storing each count in a commonly accessible storage location, reading into the processors at least some of the count values once all of the processors have stored their count, and storing only the selected subsets of elements in the pack vector based at least in part on the count values.

25 Claims, 8 Drawing Sheets

MULTISTREAMED PROCESSOR VECTOR PACKING METHOD AND APPARATUS

FIELD OF THE INVENTION

This invention relates to the field of multiprocessor information-processing devices, and more specifically to method of processing arrays in a multiprocessor environment, for example, packing a sparse array into a packed array.

BACKGROUND OF THE INVENTION

Arrays in memory of supercomputers often reach large numbers of elements. When packing an array by selecting and moving a subset of elements based on a certain criteria, a single processor must determine which elements to include in the packed array. This process of packing an array typically includes loading the large array (the source array), individually selecting a number of elements from the large array, and individually storing the elements to the packed array (the destination array). Each step in this process typically includes manipulating and performing multiple operations on each element in the large array all with a single processor.

What is needed is an efficient and robust method and apparatus to perform such a packing operation using multiple processors.

SUMMARY OF THE INVENTION

The present invention provides an apparatus and computerized method for processing an array held in memory to generate a pack vector holding only certain elements specified by a predetermined criteria. In some embodiments the method includes reading a different subset of the array into each one of a plurality of processors, selecting a subset of elements within each processors' subset of the array that meet a predetermined criteria, and counting each of the selected subsets of elements and storing the resulting count values in a commonly accessible storage location. Once all of the plurality of processors have stored their respective count values, some embodiments of the method further include reading into at least some of the plurality of processors at least one of the count values and storing only the respective selected subset of elements by each one of the plurality of processors into successive portions of a destination pack vector. In some embodiments, the storing of only the respective select subset of elements is at least in part based on the read count values. Some embodiments include a machine-readable medium having instructions thereon to perform this method on a suitably programmed information-processing device.

Another embodiment of the present invention provides a system including an information-processing device. In some embodiments, information-processing device is a supercomputer. In some embodiments, the information-processing device includes a plurality of processors each operatively coupled to a memory. In some embodiments, the memory includes an array which has one or more elements. In some further embodiments, the memory further includes a count value array and a pack vector. Some embodiments of the information-processing system further include a synchronization circuit that holds execution of the processors at a point in execution until all participating processors have reached a specified point. In further embodiments, the processor includes a vector register that holds a subset of an array stored in memory that is read into the vector register by a reader circuit. The reader circuit further reads count values from the count value array. Some embodiments of the processor also include a determiner circuit that determines a subset of elements within the vector register that meet a predetermined criteria and a counter circuit that determines a count value representative of the determined subset of elements in the vector register. Some embodiments of the processor include a store circuit that stores the count value and determined elements through a gate based on received and performed commands.

DESCRIPTION OF EMBODIMENTS OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

Figure 1:
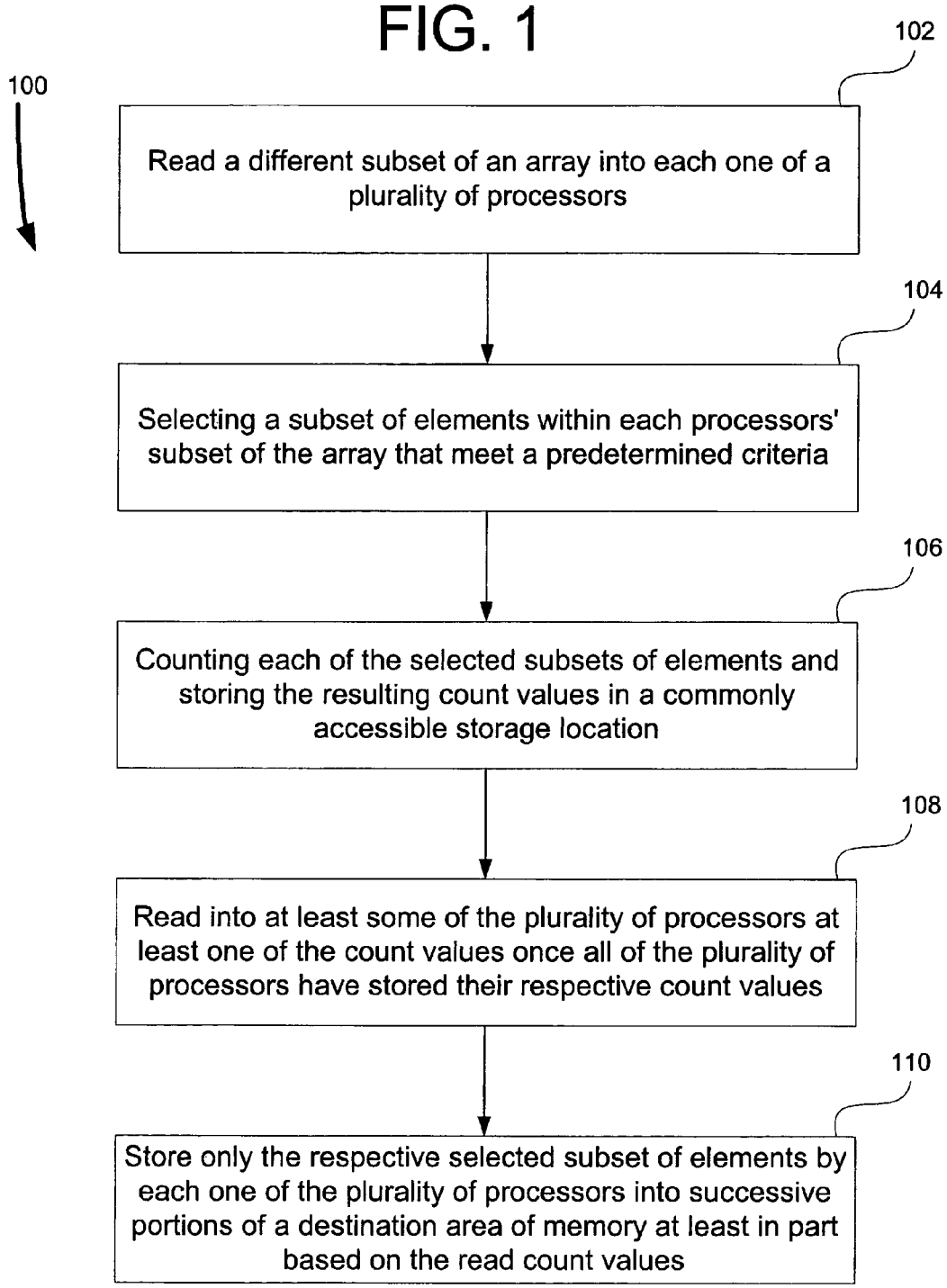
FIG. 1 shows a flow diagram of a method according to an embodiment of the present invention.

FIG. 1 shows one embodiment of a method 100 according to the present invention. Method 100 is a computerized method for processing an array held in memory to generate a pack vector holding only certain elements specified by a predetermined criteria. In some embodiments, method 100 includes reading 102 a different subset of the array into each one of a plurality of processors, selecting 104 a subset of elements within each processors' subset of the array that meet a predetermined criteria, and counting 106 each of the selected 104 subsets of elements and storing the resulting count values in a commonly accessible storage location. Once all of the plurality of processors have stored their respective count values, some embodiments of method 100 further include reading 108 into at least some of the plurality of processors at least one of the count values and storing 110 only the respective selected 104 subset of elements by each one of the plurality of processors into successive portions of a destination pack vector. In some embodiments, the storing 110 of only the respective select 104 subset of elements is at least in part base on the read 108 count values.

In some embodiments of the method 100, the processors are vector supercomputer processors. In some further embodiments of the method 100, the plurality of processors includes two or more processors. One specific embodiment of method 100 includes four processors. Other embodiments of method 100, the plurality of processors includes processors four single stream processors ("SSP") grouped together to form a multistream processor ("MSP"). Such embodiments using a MSP sometimes include implementations having more than one MSP operatively coupled together.

Figure 2:
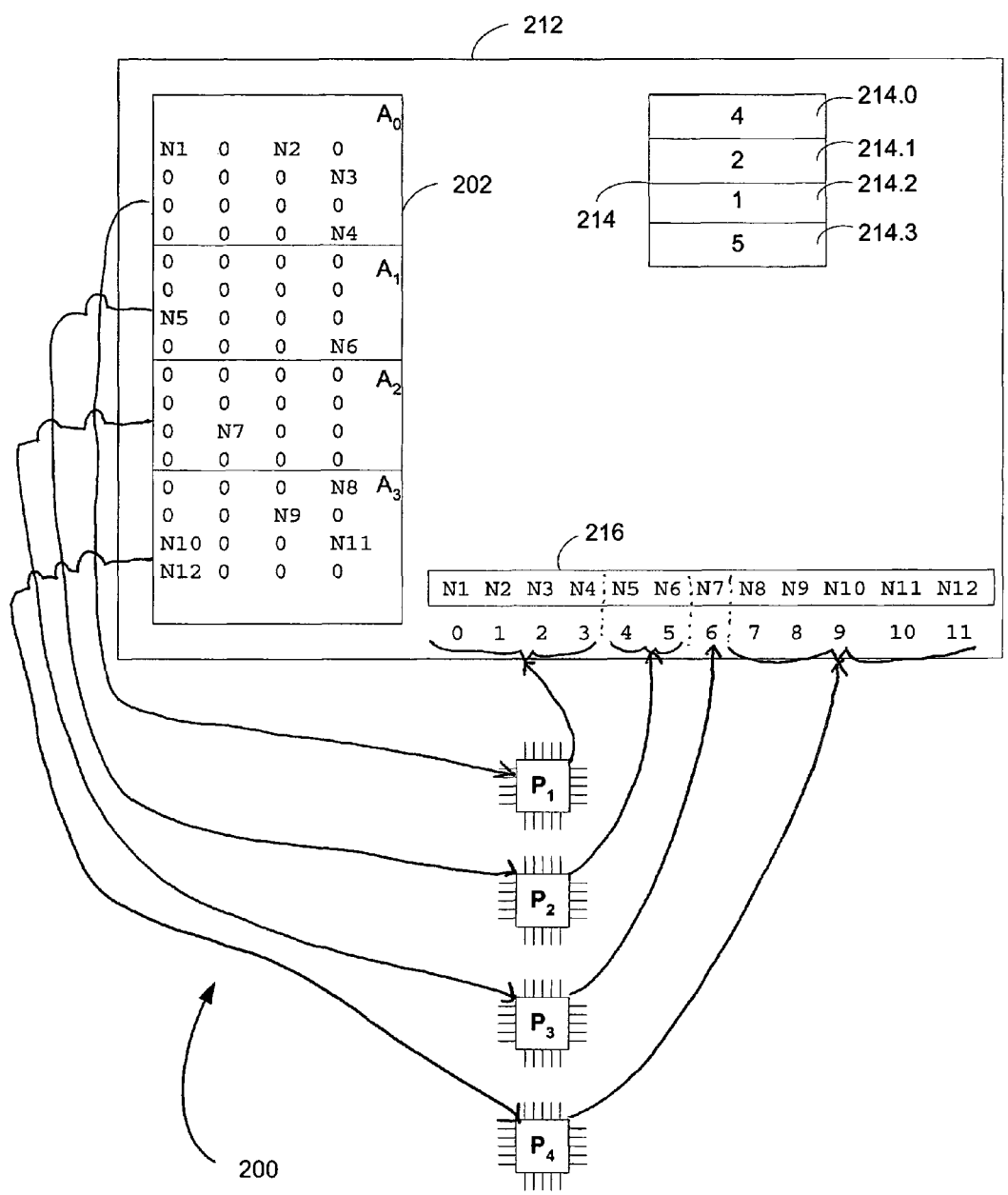
FIG. 2 shows a flow diagram according to the present invention.

FIG. 2 shows an execution flow diagram 200 of an exemplary embodiment of method 100. The flow diagram 200 includes a memory 212 holding an array 202, a temporary count array 214 that only exists for a period of time necessary for the method 100 to execute, and a pack vector 216. Pack vector 216 is the end product or result of the method 100 in this embodiment. Also shown in flow diagram 200 are four processors $P_1$, $P_2$, $P_3$, and $P_4$. In this exemplary embodiment, the array 202 has 64 elements for ease of explanation, however array 202 will typically have many more elements. The array 202 is divided into four subsets $A_0$, $A_1$, $A_2$, $A_3$, each having 16 elements. Count array 214 has four elements 214.0, 214.1, 214.2, 214.3. The elements of count array 214 are used to store the count values once each of the selected elements of the array subsets $A_0$, $A_1$, $A_2$, $A_3$ are counted 106.

The processors $P_1$, $P_2$, $P_3$, and $P_4$ are each assigned one of the subsets of the array 202. $P_1$ is assigned $A_0$, $P_2$ is assigned $A_1$, $P_3$ is assigned $A_2$, and $P_4$ is assigned $A_3$. In parallel, the processors $P_1$, $P_2$, $P_3$, and $P_4$ read 102 their respective subset, select 104 a subset of elements within their respective subset of the array 202 that meet a predetermined criteria (these elements that meet the predetermined criteria are shown as N1 through N12 in the array 202), and count 106 their respective selected 104 elements and store the resulting count values (4, 2, 1, and 5) into the count array 214. Thus, $P_1$ counts four elements in $A_0$ that meet the criteria (such as non-zero elements N1, N2, N3, and N4), $P_2$ counts two elements in $A_1$ (N5 and N6), $P_3$ counts one element in $A_2$ (N7), and $P_4$ counts five elements in $A_3$ (N8, N9, N10, N11, and N12). These count values are shown in the count array 214 in locations 214.0, 214.1, 214.2, and 214.3.

Once all of the processors $P_1$, $P_2$, $P_3$, and $P_4$ have stored their respective count values, the processors $P_1$, $P_2$, $P_3$, and $P_4$ read 108 at least one of the count values to facilitate address generation for storing 110 into memory 212 of the pack vector results in parallel. For example, $P_2$ reads at least the first count value from location 214.0 so it knows to begin writing its selected 104 elements at location 4 of pack vector 216 (i.e., its starting address is the starting address of the packed array plus the count value determined by $P_1$). In some embodiments, $P_2$ reads all count values for use in determining addresses for subsequent passes through a loop that handles processing source array 202 when it has a very large number of elements. $P_3$ and $P_4$ read the count values from locations 214.1 and 214.2 respectively. To provide the capability for the method 100 to iteratively process an array with more subsets than processors, $P_1$ reads all of the count values and maintains a running count of the number of elements stored to the pack vector in previous iterations. For instance, in the present example, if the array 202 had more elements than could be handled by the vector operations of a single pass, one or more further iterations would be needed to process the entire array 202. In the second iteration of the method 100, $P_1$ in this example determined that it has a running count of 12 indicating that the first selected element in the second iteration would be written by $P_1$ to the twelfth location in the destination, packed array 216.

The storing 110 of the selected elements is performed in parallel by the processors $P_1$, $P_2$, $P_3$, and $P_4$. $P_1$ stores 110 four elements N1 through N4 in pack vector 216 elements 0 through 3 and $P_2$ stores 110 two elements N5 and N6 into pack vector 216 elements 4 and 5. $P_3$ stores 110 one element N6 into pack vector 216 element 6 and $P_4$ stores 110 five elements N8 through N12 into pack vector 216 elements 7 through 11.

Figure 3:
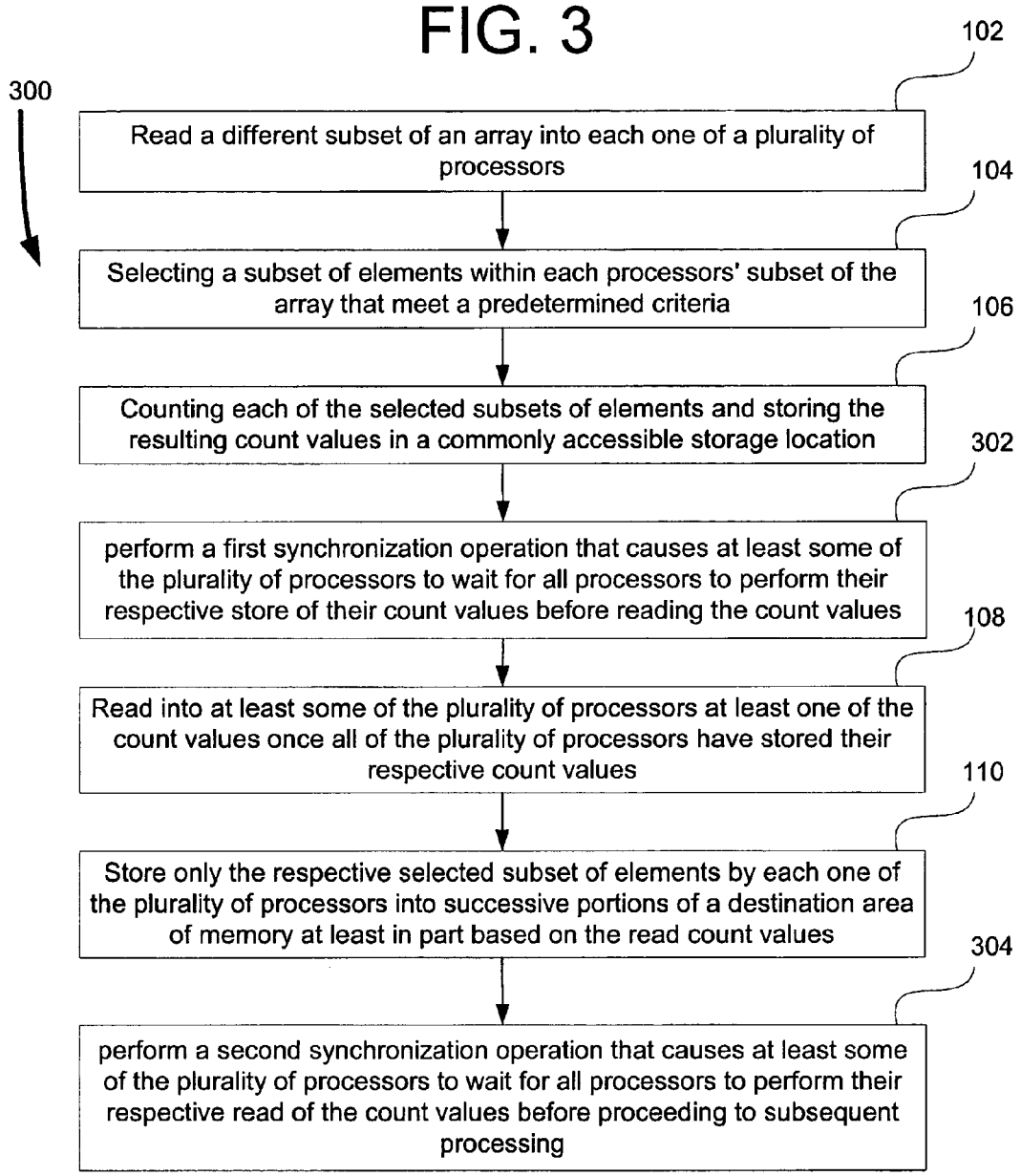
FIG. 3 shows a flow diagram of a method according to an embodiment of the present invention.

FIG. 3 shows another embodiment of a method 300 according to the present invention. In some embodiments, method 300 includes reading 102 a different subset of the array into each one of a plurality of processors, selecting 104 a subset of elements within each processors' subset of the array that meet a predetermined criteria, counting 106 each of the selected 104 subsets of elements and storing the resulting count values in a commonly accessible storage location. Following the storing 106 of the resulting count values and prior to the reading 108 of the count values, a synchronization operation 302 is performed that causes at least some of the plurality of processors to wait for all processors to perform their respective store 106 of their respective count values. This is performed because in some embodiments of method 300, the count value must be available for some or all of the processors prior to performing any further processing. Method 300 further includes reading 108 into at least some of the plurality of processors at least one of the count values and storing 110 only the respective selected 104 subset of elements by each one of the plurality of processors into successive portions of a destination pack vector. In some embodiments, the storing 110 of only the respective select 104 subset of elements is at least in part base on the read 108 count values. Some further embodiments of method 300 include performing a second synchronization operation 304 that causes some or all of the processors to wait for all of the processors to perform their respective reads of some or all of the count values prior to proceeding with subsequent processing.

In some embodiments, the synchronization operations 302, 304 include an Msync operation. For a fuller description of synchronization operations including Msync and others, please refer to the U.S. patent applications entitled "Multistream Processing System and Method", filed on even date herewith, "System and Method for Synchronizing Memory Transfers", file on even date herewith, and "Method and Apparatus for Local Synchronizations in a Vector Processing System", filed on even date herewith, the descriptions of which are hereby incorporated by reference. In some other embodiments, the synchronization operations 302, 304 include each processor executing a "busy loop." In some embodiments, a busy loop is an iterative process that repeatedly polls another process or memory location for an indication that all processes required to be synchronized have reached the required point in execution to allow execution of the method 300 to proceed.

Figure 4:
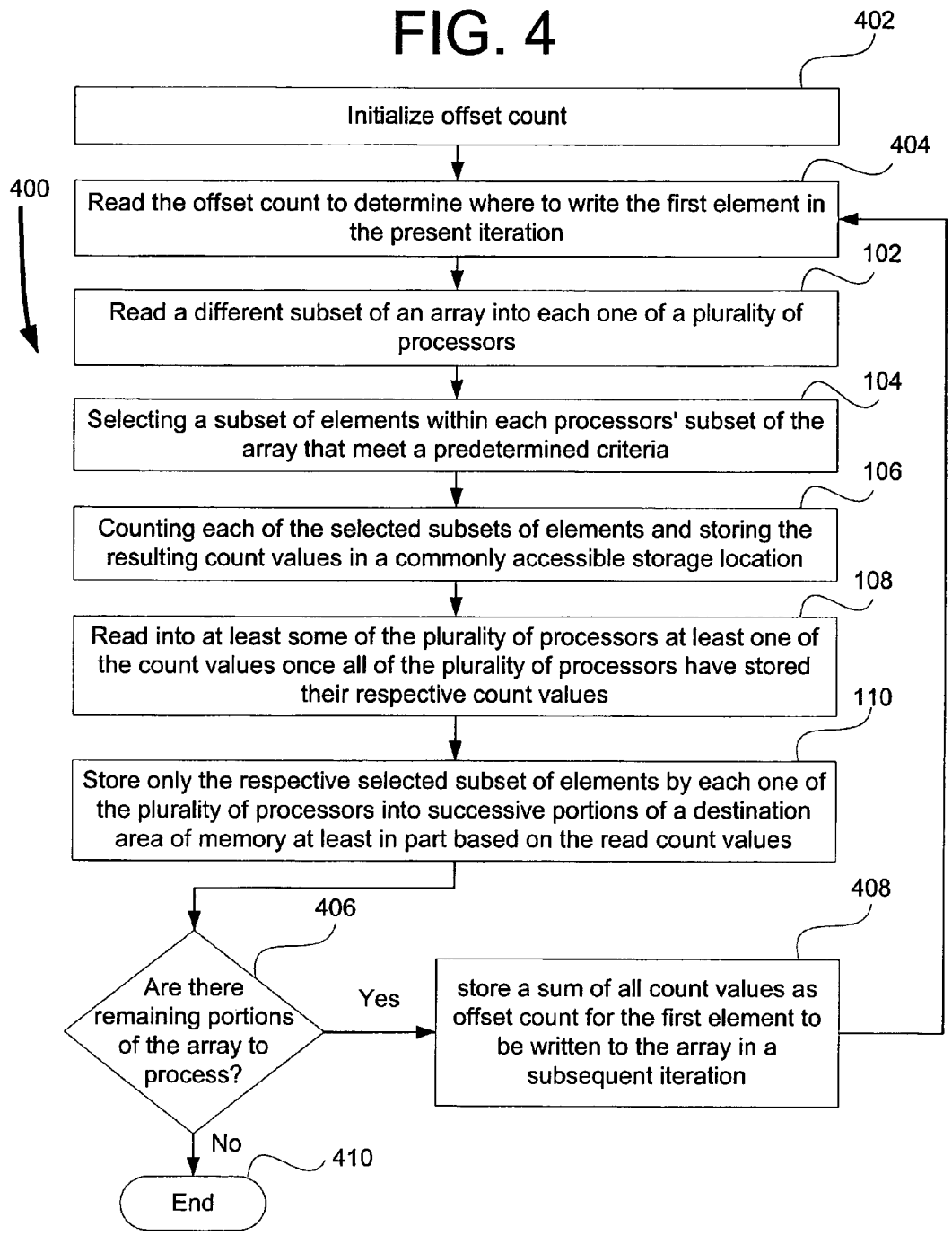
FIG. 4 shows a flow diagram of a method according to an embodiment of the present invention.

FIG. 4 shows an embodiment of a method 400 according to the invention. Method 400 includes initializing 402 an offset count. This initialization 402 sets a running count variable to 0, 1, or any other number, position, or location identifier indicating the first position to populate in a pack vector the method 400 executes to create. Method 400 further includes reading 404 the offset count to determine where to write the first element in the pack vector for the instant iteration. This embodiment of the method 400 further includes reading 102 a different subset of the array into each one of a plurality of processors, selecting 104 a subset of elements within each processors' subset of the array that meet a predetermined criteria. In some embodiments, the predetermined criteria includes a select mask. In some embodiments, the select mask is a bit in each element of the array that has the function of indicating which elements to select.

Method 400 further includes counting 106 each of the selected 104 subsets of elements and storing the resulting count values in a commonly accessible storage location. Once all of the plurality of processors have stored their respective count values, some embodiments of method 400 further include reading 108 into some or all of the processors one or more of the count values and storing 110 each processor's selected 104 subset of elements into locations of a destination pack vector. In some embodiments, the storing 110 of the selected 104 subset of elements is at least in part base on the read 108 count values. For example, the first processor stores its respective elements beginning at the location indicated by the running count variable. The next processor stores its respective elements beginning at the location determined by adding the running count variable and the count value of the first processor. The next processor, if another processor remains, stores its respective elements beginning at the location determined by adding the running count variable and the count values of the processors that have already stored their respective elements. This continues until all of the participating processors have stored their respective elements in the pack vector.

In some embodiments, method 400 continues by polling 406 whether there are remaining portions of the array to process. If not, the pack vector is complete and method 400 terminates 410. However, if there are remaining portions of the array to process, method 400 stores 408 a sum of all count values and the running count variable as a new value in the running count variable. Execution then proceeds back to the read 404 of the offset count to determine where to write the first element of this next iteration. Execution of the method 400 then proceeds as described above and illustrated in FIG. 4 until there are no remaining portions of the array to process. Once there are no remaining portions of the array to process, the method 400 terminates.

Figure 5:
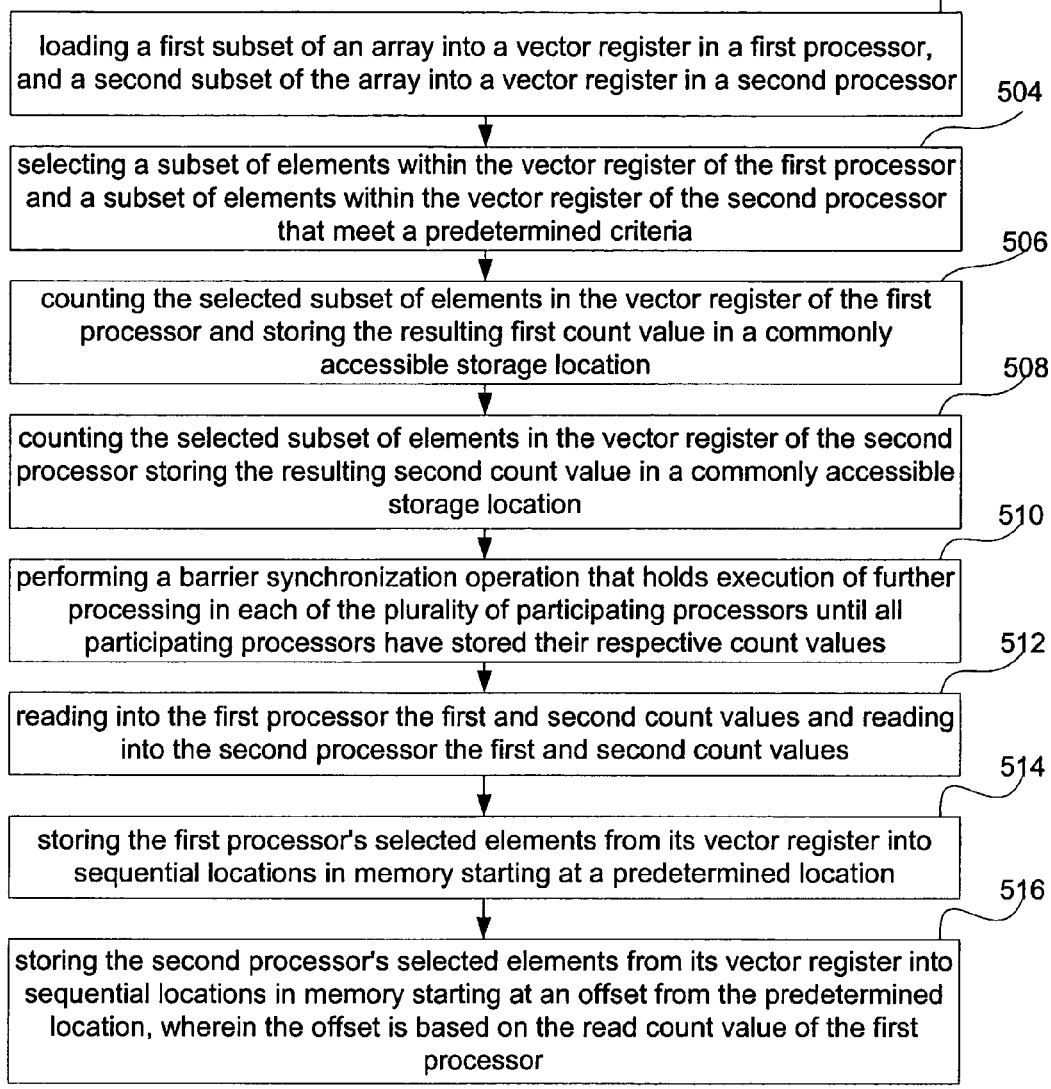
FIG. 5 shows a flow diagram of a method according to an embodiment of the present invention.

FIG. 5 shows yet another method 500 according to the present invention. In some embodiments, the method 500 is performed in a system that includes a memory having an array stored therein, and including at least a first and a second processor, each operatively coupled to the memory. In some such embodiments, the method 500 includes loading 502 a first subset of the array into a vector register in the first processor, and a second subset of the array into a vector register in the second processor and selecting 504 a subset of elements within the vector register of the first processor and a subset of elements within the vector register of the second processor that meet a predetermined criteria. In some embodiments, the predetermined criteria is specified by a mask.

Some embodiments of the method further include counting 506, 508 the selected 504 subset of elements in each processors' vector register and storing the resulting first count values in a commonly accessible storage location. In some embodiments, a first barrier-synchronization operation 510 is executed following the storing of the count values that prevents further processing in each of the participating processors until all processors have stored their respective count values. Once the first barrier-synchronization operation 510 has completed, some embodiments include reading 512 the count values into both the first and second processors each of the count values.

Figure 6:
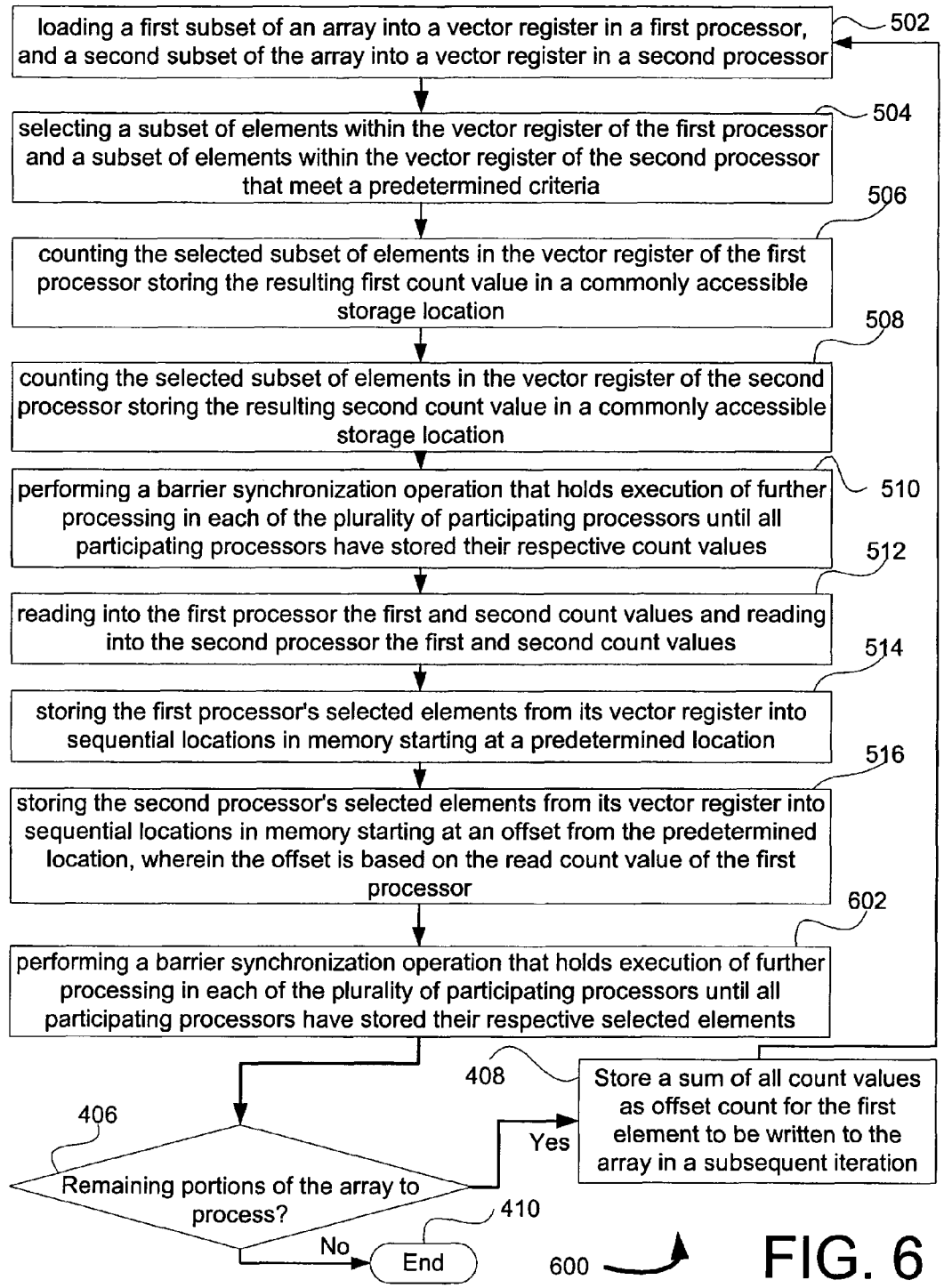
FIG. 6 shows a flow diagram of a method according to an embodiment of the present invention.

In some embodiments, method 500 packs the pack vector by storing 514 the first processor's selected 504 elements from its vector register into sequential locations in memory starting at a predetermined location and storing 516 the second processor's selected 504 elements from its vector register into sequential locations in memory starting at an offset equal to the count 506 of the selected elements in the first processor from the predetermined location FIG. 6 shows another embodiment of a method 600 according to the present invention. The method 600 is a variation on method 500. The variation in method 600 provides for iterative processing of the array in memory. The method 600 proceeds as method 500 but continues by performing 602 a barrier-synchronization operation that holds execution of further processing in each of the plurality of participating processors until all participating processors have stored their respective selected elements. Once all of the elements have been stored by the processors, some embodiments of the method 600 continue by polling 406 whether there are remaining portions of the array to process. If not, the pack vector is complete and the method 600 terminates 410. However, if there are remaining portions of the array to process, method 400 stores 408 a sum of all count values and a running count variable is maintained to offset subsequent storing of selected 504 elements. Processing then proceed back to the loading 502 of a subsets of the array into the processors. Processing then continues and iterates until there are no remaining portions of the array to process.

Some embodiments of the methods 100, 300, 400, 500, and 600 include dividing an array in memory into 256-element blocks. Each 256-element block is further divided into four chunks of up to 64 elements. These chunks are each given to a SSP. Each SSP performs a pop count of selected elements and stores its pop count to memory, performs a barrier synchronization, then reads in all four SSP pop count contributions from memory. The SSPs then store their selected elements to the pack vector in memory taking into account the contribution of the SSPs to their left. Thus SSP 0 stores its selected elements with no addition because it does not have a SSP to its left. SSP 1 stores its contribution sequentially following the selected elements of SSP 0. SSP 2 stores its selected elements following the selected elements of both SSP 0 and SSP1. SSP 3 stores its selected elements following the selected elements of both SSP 0, SSP1 and SSP2. Then all SSPs add the contribution of all four SSPs for the next iteration. Finally another barrier-synchronization operation is performed to ensure the loads of the selected elements of each SSP are complete before the next iteration is performed.

Some embodiments further include encoding executable instructions on a machine-readable medium. These executable instructions, when executed on a suitably programmed information-processing system, cause one or more of the methods 100, 300, 400, 500, and 600 to be performed. A pseudo-code embodiment of such executable instructions is as follows:

```
do ii=1,n,256
   first=ii+(ssp*64)
   last=min(first+63,n)
   !dir$ shortloop
   do i=first,last
      compute pop-count
      store pop-count to array indexed by ssp
      barrier
      load all 4 pop-counts
      store to pack vector taking into account ssps to the left
         contributions
      add total MSP contributions to running count
      barrier
   end do
end do
```

Figure 7A:
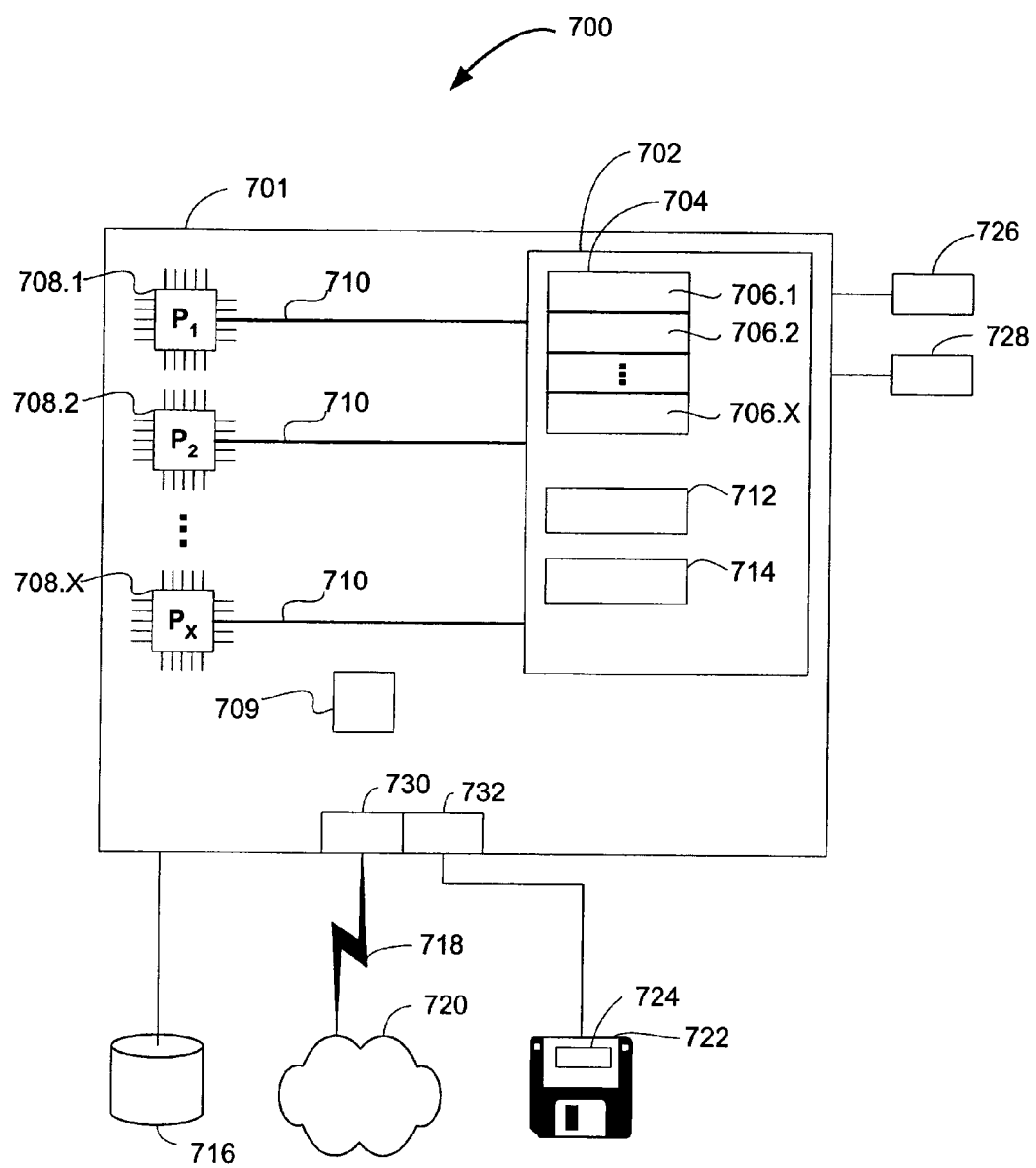
FIG. 7A shows a schematic view of an apparatus according to an embodiment of the present application.

FIG. 7A shows a system 700 according to the invention. In some embodiments, the system 700 includes an information-processing device 701. In some embodiments, the information-processing device 701 is a supercomputer. In some embodiments, the information-processing device 701 includes a plurality of processors 708.1, 708.2, . . . 708.X each operatively coupled 710 to a memory 702. In some further embodiments, the processors 708.1, 708.2, . . . 708.X are vector supercomputer processors. In some embodiments, the memory 702 includes an array 704 which has one or more elements 706.1, 706.2, . . . 706.X. The memory 702 further includes a count value array 712 and a pack vector 714.

In various embodiments, the system 700 includes an input device 726, an output device 728, and storage 716 operatively coupled to the information-processing device 701. In some embodiments, storage 716 includes a hard disk. In some other embodiments, storage 716 includes a storage area network. In some embodiments, the information-processing device 701 includes a media reader 732, a computer-readable storage medium 722, and a communication link 730 operatively coupled 718 to a network 720. Some embodiments of the information-processing system 701 further include a synchronization circuit 709 that holds execution of the processors 708.1, 708.2, . . . 708.X at a point in execution until all participating processors have reached a specified point in execution.

In various embodiments, network 720 includes a local area network, wide area network, virtual private network, and the Internet. In some embodiments, the computer-readable storage medium 722 has executable instructions 724 encoded thereon for performing the methods described above. In some other embodiments, the executable instructions are encoded on a hard disk 716 operatively coupled to the information-processing system 701. In other embodiments, the executable instructions 724 are encoded in a carrier wave (considered herein to be a computer-readable transmission medium) received over the communication link 730.

Figure 7B:
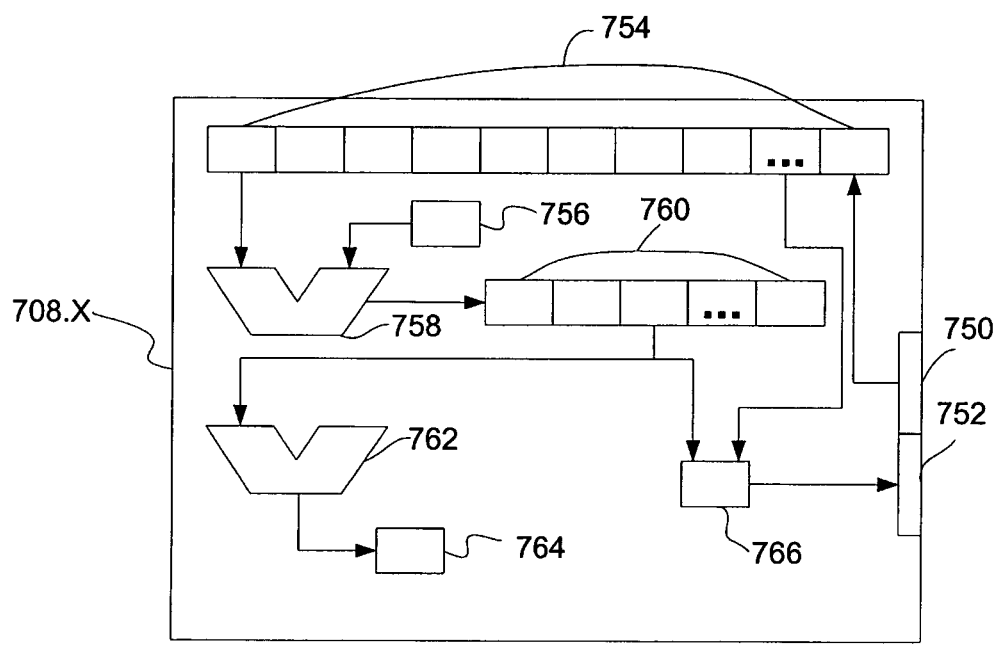
FIG. 7B shows a schematic view of an apparatus according to an embodiment of the present application.

FIG. 7B shows a detailed view of a processor 708.X according to the present invention. In some embodiments, the processor 708.X includes a vector register 754 that holds a subset of the array 704 stored in memory 702 that is read into the vector register 754 by a reader circuit 750. The reader circuit 750 further reads count values from the count value array 712. Some embodiments of the processor 708.X also include a determiner circuit 758 that determines subset of elements 760 within the vector register 754 first processor 708.X that meet a predetermined criteria 756 and a counter circuit 762 that determines a count value 764 representative of the determined subset of elements 760 in the vector register of the first processor. Some embodiments of the processor 708.X include a store circuit 752 that stores the count value 764 and determined elements 760 through a gate 766 based on received and performed operation commands.

One aspect of the present invention shown in FIG. 1 includes a computerized method 100 for processing an array in memory. This method 100 includes reading 102 a different subset of the array into each one of a plurality of processors, selecting 104 a subset of elements within each processors' subset of the array that meet a predetermined criteria, counting 106 each of the selected subsets of elements and storing the resulting count values in a commonly accessible storage location, once all of the plurality of processors have stored their respective count values, reading 108 into at least some of the plurality of processors at least one of the count values, and at least in part based on the read count values, storing 110 only the respective selected subset of elements by each one of the plurality of processors into successive portions of a destination pack array.

Some embodiments of the method 300 shown in FIG. 3 further include performing 302 a first synchronization operation that causes at least some of the plurality of processors to wait for all processors to perform their respective store of their count values before reading the count values.

Some embodiments of the method 300 further include performing 304 a second synchronization operation that causes at least some of the plurality of processors to wait for all processors to perform their respective read of the count values before proceeding to subsequent processing.

Some embodiments of the methods 100, 200, and 300 further include in each processor, reading its respective allocated subset of the array into a vector register in the respective processor, and wherein the selected subset of elements are indicated by bits in a mask vector, and wherein the mask vector is used in selecting elements for the storing of its respective subset of elements.

Some embodiments of the method 400 as shown in FIG. 4 further include iteratively performing a set of the described operations.

Some embodiments of the method 400 further include storing 408 an offset count for the first element to be written to the array in a subsequent iteration, and reading 404 the offset count to determine where to write the first element in the subsequent iteration.

Another aspect of the present invention includes a method 500 shown in FIG. 5 performed in a system that includes a memory having an array stored therein, and a plurality of participating processors, including a first processor and a second processor, each operatively coupled to the memory. This method includes (a) loading 502 a first subset of the array into a vector register in the first processor, and a second subset of the array into a vector register in the second processor, (b) selecting 504 a subset of elements within the vector register of the first processor and a subset of elements within the vector register of the second processor that meet a predetermined criteria, (c) counting 506 the selected subset of elements in the vector register of the first processor and storing the resulting first count value in a commonly accessible storage location, (d) counting 508 the selected subset of elements in the vector register of the second processor and storing the resulting second count value in a commonly accessible storage location, (e) performing 510 a first barrier-synchronization operation that holds execution of further processing in each of the plurality of participating processors until all participating processors have stored their respective count values, (f) once the first barrier-synchronization operation has completed, reading 512 into the first processor the first and second count values, and reading into the second processor the first and second count values, (g) storing 514 the first processor's selected elements from its vector register into sequential locations in memory starting at a predetermined location, and (h) storing 516 the second processor's selected elements from its vector register into sequential locations in memory starting at an offset from the predetermined location, wherein the offset is based on the read count value of the first processor.

Some embodiments of this method 600 shown in FIG. 6 further include (i) performing 602 a second barrier-synchronization operation that holds execution of further processing in each of the plurality of participating processors until all participating processors have stored their respective selected elements, and (j) once the second barrier-synchronization operation has completed, repeating the operations of (a)

through (g) described above with reference to FIG. 5 and reference signals 502, 504, 506, 508, 510, 512, 514, and 516.

Some embodiments of the method further include storing 408 an offset count for a first element to be written to the array in a subsequent execution of the operations (a) through (g), and reading the offset count to determine where to write the first element in the subsequent execution.

In some embodiments, the operations of (a) through (g) are performed in the order described.

In some embodiments, the selected subset of elements are indicated by bits in a mask vector, and wherein the mask vector is used in selecting elements for the storing of its respective subset of elements.

Another aspect of the present invention includes a computer-readable storage medium 722 shown in FIGS. 7A and 7B having instructions 724 stored therein for causing a suitably programmed information-processing system that includes a memory 702 having an array 704 stored therein, and a plurality of participating processors 708.1, 708.2 . . . 708.X, including a first processor 708.1 and a second processor 708.2, each operatively coupled 710 to the memory 702, to perform a method that includes: (a) loading a first subset 706.1 of the array 704 into a vector register 754 in the first processor 708.1, and a second subset 706.2 of the array 704 into a vector register 754 in the second processor 708.2, (b) selecting a subset of elements within the vector register 754 of the first processor 708.1 and a subset of elements within the vector register 754 of the second processor 708.2 that meet a predetermined criteria, and (c) counting the selected subset of elements in the vector register 754 of the first processor 708.1 and storing the resulting first count value in a commonly accessible storage location 712. The computer-readable storage medium further includes: (d) counting the selected subset of elements in the vector register 754 of the second processor 708.2 and storing the resulting second count value in a commonly accessible storage location 712, and (e) performing a first barrier-synchronization operation that holds execution of further processing in each of the plurality of participating processors 708.1, 708.2, . . . 708.X until all participating processors 708.1, 708.2, . . . 708.X have stored their respective count values. Further yet, the computer-readable storage medium 722 includes: (f) once the first barrier-synchronization operation has completed, reading into the first processor 708.1 the first and second count values, and reading into the second processor 708.2 the first and second count values, (g) storing the first processor's 708.1 selected elements from its vector register 754 into sequential locations in memory 702 starting at a predetermined location, and (h) storing the second processor's selected elements from its vector register 754 into sequential locations in memory 702 starting at an offset from the predetermined location, wherein the offset is based on the read count value of the first processor 708.1.

Yet another aspect of the present invention includes a memory 702 having an array 704 stored therein, a plurality of processors 708.1, 708.2, . . . 708.X each operatively coupled 710 to the memory 702, means 750 for reading a different subset of the array 704 into each one of a plurality of processors 708.1, 708.2, . . . 708.X, and in each one of the plurality of processors 708.1, 708.2, . . . 708.X, means for determining 758 a subset of elements within that processor's 708.X subset of the array that meet a predetermined criteria 756. The current aspect of the present invention further includes in each one of the plurality of processors 708.1, 708.2, . . . 708.X, means for counting 762 the selected subset of elements and storing the resulting count in a commonly accessible storage location 712, means for reading 750 into at least some of the plurality of processors 708.1, 708.2, . . . 708.X at least one of the count values once all of the plurality of processors 708.1, 708.2, . . . 708.X have stored their respective count values, and means for storing 752, at least in part based on the read count values, the determined subset of elements by each one of the plurality of processors 708.1, 708.2, . . . 708.X into sequential portions of a destination area 714 of memory 702.

Some embodiments further include means for performing a first synchronization operation that causes at least some of the plurality of processors 708.1, 708.2, . . . 708.X to wait for all processors to perform their respective store of their count values before reading the count values.

Some embodiments further include means for performing a second synchronization operation that causes at least some of the plurality of processors to wait for all processors to perform their respective read of the count values before proceeding to subsequent processing.

Some embodiments further include in each processor, means for reading 750 its respective read subset of the array 706.X into a vector register 754 in the respective processor 708.X, and in each processor 708.1, 708.2, . . . 708.X, a mask register 760, wherein the read subset of elements are indicated by bits in the mask vector, and wherein the mask register 760 is used in reading elements for the storing of its respective subset of elements.

Still another aspect of the present invention includes a memory 702 having an array 704 stored therein, a plurality of participating processors 708.1, 708.2, . . . 708.X, including a first processor 708.1 and a second processor 708.2, each operatively coupled 710 to the memory 702, a vector register 754 in the first processor 708.1 that holds a first subset of the array, a vector register 754 in the second processor 708.2 that holds a second subset of the array, and a determiner circuit 758 that determines a subset of elements within the vector register 754 of the first processor 708.1 that meet a predetermined criteria 756. The current aspect of the present invention further includes a determiner circuit 758 that selects a subset of elements within the vector register 754 of the second processor 708.2 that meet a predetermined criteria 756, a first counter circuit 762 in the first processor 708.1 that determines a first count value representative of the determined subset of elements in the vector register 754 of the first processor 708.1, a first store circuit 752 in the first processor 708.1 that stores the resulting first count value in a commonly accessible storage location 712, a second counter circuit 762 in the second processor 708.2 that determines a second count value representative of the determined subset of elements in the vector register 754 of the second processor 708.2, a second store circuit 752 in the second processor 708.2 that stores the resulting second count value in a commonly accessible storage location 712, a synchronization circuit 709 that holds execution of processing at a first point in execution in each of the plurality of participating processors 708.1, 708.2, . . . 708.X until all participating processors have stored their respective count values. Further aspects of the present invention include a reader circuit 750 in the first processor 708.1 that reads into the first processor 708.1 the first and second count values from the commonly accessible storage location 712 once the synchronization circuit 709 releases its hold on execution of processing, a reader circuit 750 in the second processor 708.2 that reads into the second processor 708.2 the first and second count values from the commonly accessible storage location 712 once the synchronization circuit 709 releases its hold on execution of processing, the first store circuit 752 in the first processor 708.1 that stores the first processor's 708.1 selected elements from its vector register 754 into sequential locations in memory 702 starting at a predetermined location, and the second store circuit 752 in the second processor 708.2 that stores the second processor's 708.2 selected elements from its vector register 754 into sequential locations in memory 702 starting at an offset from the predetermined location, wherein the offset is based on the first count value.

In some embodiments, the synchronization circuit 709 is further used to hold execution of further processing at a second point in execution in each of the plurality of participating processors 708.1, 708.2, ... 708.X until all participating processors have stored their respective selected elements into memory 702.

Some further embodiments include a first register in the first processor 708.1 that holds a first mask vector 760, and a second register in the second processor 708.2 that holds a second mask vector 760, wherein the first mask vector 760 indicates which elements in the first subset of the array 706.1 are to be selected by the selection circuit 758, and the second mask vector 760 indicates which elements in the second subset of the array 706.2 are to be selected by the selection circuit 758.

Yet another aspect of the present invention includes a machine-readable storage medium 722 having executable instructions stored therein for causing a suitably programmed information-processing system 701 to process an array 704 in memory 702 using a method including reading a different subset of the array into each one of a plurality of processors, selecting a subset of elements within each processors' subset of the array that meet a predetermined criteria, counting each of the selected subsets of elements and storing the resulting count values in a commonly accessible storage location, once all of the plurality of processors have stored their respective count values, reading into at least some of the plurality of processors at least one of the count values, and at least in part based on the read count values, storing only the respective selected subset of elements by each one of the plurality of processors into successive portions of a destination area of memory.

Some embodiments of the present invention further include after storing the count values performing a first synchronization operation that causes at least some of the plurality of processors to wait for all processors to perform their respective store of their count values before reading the count values.

Some further embodiments of the present invention further include after storing respective selected elements, performing a second synchronization operation that causes at least some of the plurality of processors to wait for all processors to perform their respective read of the count values before proceeding to subsequent processing.

Yet further embodiments of the present invention include in each processor, reading its respective allocated subset of the array into a vector register in the respective processor, and wherein the selected subset of elements are indicated by bits in a mask vector, and wherein the mask vector is used in selecting elements for the storing of its respective subset of elements.

Further still, some embodiments of the present invention include iteratively performing a set of the operations.

Some further embodiments of the present invention include storing an offset count for the first element to be written to the array in a subsequent iteration, and reading the offset count to determine where to write the first element in the subsequent iteration.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computerized method comprising:
reading a different subset of a source array into each one of a plurality of processors, the source array having one or more elements that meet a predetermined criteria and one or more elements that do not meet the predetermined criteria;
selecting a subset of elements within each processors' subset of the source array that meet the predetermined criteria;
counting each of the selected subsets of elements and storing the resulting count values in a commonly accessible storage location;
once all of the plurality of processors have stored their respective count values, reading into at least some of the plurality of processors at least one of the count values; and
at least in part based on the read count values, storing only the respective selected subset of elements by each one of the plurality of processors into successive portions of a destination pack array wherein the pack array contains the one or more elements meeting the predetermined criteria and does not contain the one or more elements not meeting the predetermined criteria.

2. The method of claim 1, further comprising:
performing a first synchronization operation that causes at least some of the plurality of processors to wait for all processors to perform their respective store of their count values before reading the count values.

3. The method of claim 2, further comprising:
performing a second synchronization operation that causes at least some of the plurality of processors to wait for all processors to perform their respective read of the count values before proceeding to subsequent processing.

4. The method of claim 1, further comprising:
in each processor, reading its respective allocated subset of the array into a vector register in the respective processor;
and wherein the selected subset of elements are indicated by bits in a mask vector, and wherein the mask vector is used in selecting elements for the storing of its respective subset of elements.

5. The method of claim 1, further comprising:
iteratively performing a set of the described operations.

6. The method of claim 5, further comprising:
storing an offset count for the first element to be written to the pack array in a subsequent iteration; and
reading the offset count to determine where in the pack array to write the first element in the subsequent iteration.

7. A method performed in a system that includes a memory having an array stored therein, and a plurality of participating processors, including a first processor and a second processor, each operatively coupled to the memory, the method comprising:
a) loading a first subset of the array into a vector register in the first processor, and a second subset of the array into a vector register in the second processor;

b) selecting a subset of elements within the vector register of the first processor and a subset of elements within the vector register of the second processor that meet a predetermined criteria;
c) counting the selected subset of elements in the vector register of the first processor and storing the resulting first count value in a commonly accessible storage location;
d) counting the selected subset of elements in the vector register of the second processor and storing the resulting second count value in a commonly accessible storage location;
e) performing a first barrier-synchronization operation that holds execution of further processing in each of the plurality of participating processors until all participating processors have stored their respective count values;
f) once the first barrier-synchronization operation has completed, reading into the first processor the first and second count values, and reading into the second processor the first and second count values;
g) storing the first processor's selected elements from its vector register into sequential locations in memory starting at a predetermined location; and
h) storing the second processor's selected elements from its vector register into sequential locations in memory starting at an offset from the predetermined location, wherein the offset is based on the read count value of the first processor.

8. The method of claim 7, further comprising:
i) performing a second barrier-synchronization operation that holds execution of further processing in each of the plurality of participating processors until all participating processors have stored their respective selected elements; and
j) once the second barrier-synchronization operation has completed, repeating the operations of (a) through (g).

9. The method of claim 8, further comprising:
storing an offset count for a first element to be written to the array in a subsequent execution of the operations (a) through (g); and
reading the offset count to determine where to write the first element in the subsequent execution.

10. The method of claim 7, wherein the operations of (a) through (g) are performed in the order described.

11. The method of claim 7, wherein the selected subset of elements are indicated by bits in a mask vector, and wherein the mask vector is used in selecting elements for the storing of its respective subset of elements.

12. A non-transitory computer-readable storage medium having instructions stored therein for causing a suitably programmed information-processing system that includes a memory having an array stored therein, and a plurality of participating processors, including a first processor and a second processor, each operatively coupled to the memory, to perform a method comprising:
a) loading a first subset of the array into a vector register in the first processor, and a second subset of the array into a vector register in the second processor;
b) selecting a subset of elements within the vector register of the first processor and a subset of elements within the vector register of the second processor that meet a predetermined criteria;
c) counting the selected subset of elements in the vector register of the first processor and storing the resulting first count value in a commonly accessible storage location;
d) counting the selected subset of elements in the vector register of the second processor and storing the resulting second count value in a commonly accessible storage location;
e) performing a first barrier-synchronization operation that holds execution of further processing in each of the plurality of participating processors until all participating processors have stored their respective count values;
f) once the first barrier-synchronization operation has completed, reading into the first processor the first and second count values, and reading into the second processor the first and second count values;
g) storing the first processor's selected elements from its vector register into sequential locations in memory starting at a predetermined location; and
h) storing the second processor's selected elements from its vector register into sequential locations in memory starting at an offset from the predetermined location, wherein the offset is based on the read count value of the first processor.

13. An apparatus comprising:
a memory having a source array stored therein, the source array having one or more elements that meet a predetermined criteria and one or more elements that do not meet the predetermined criteria:
a plurality of processors each operatively coupled to the memory;
means for reading a different subset of the source array into each one of a plurality of processors;
in each one of the plurality of processors, means for determining a subset of elements within that processor's subset of the source array that meet the predetermined criteria;
in each one of the plurality of processors, means for counting the selected subset of elements and storing the resulting count in a commonly accessible storage location;
means for reading into at least some of the plurality of processors at least one of the count values once all of the plurality of processors have stored their respective count values; and
means for storing, at least in part based on the read count values, the determined subset of elements by each one of the plurality of processors into sequential portions of a destination area of memory, wherein the pack array contains the one or more elements meeting the predetermined criteria and does not contain the one or more elements not meeting the predetermined criteria.

14. The apparatus of claim 13, further comprising:
means for performing a first synchronization operation that causes at least some of the plurality of processors to wait for all processors to perform their respective store of their count values before reading the count values.

15. The apparatus of claim 14, further comprising:
means for performing a second synchronization operation that causes at least some of the plurality of processors to wait for all processors to perform their respective read of the count values before proceeding to subsequent processing.

16. The apparatus of claim 13, further comprising:
in each processor, means for reading its respective read subset of the array into a vector register in the respective processor; and
in each processor, a mask register, wherein the read subset of elements are indicated by bits in the mask vector, and wherein the mask register is used in reading elements for the storing of its respective subset of elements.

17. An apparatus comprising:
a memory having an array stored therein;
a plurality of participating processors, including a first processor and a second processor, each operatively coupled to the memory;
a vector register in the first processor that holds a first subset of the array;
a vector register in the second processor that holds a second subset of the array;
a determiner circuit that determines a subset of elements within the vector register of the first processor that meet a predetermined criteria;
a determiner circuit that selects a subset of elements within the vector register of the second processor that meet a predetermined criteria;
a first counter circuit in the first processor that determines a first count value representative of the determined subset of elements in the vector register of the first processor;
a first store circuit in the first processor that stores the resulting first count value in a commonly accessible storage location;
a second counter circuit in the second processor that determines a second count value representative of the determined subset of elements in the vector register of the second processor;
a second store circuit in the second processor that stores the resulting second count value in a commonly accessible storage location;
a synchronization circuit that holds execution of processing at a first point in execution in each of the plurality of participating processors until all participating processor have stored their respective count values;
a reader circuit in the first processor that reads into the first processor the first and second count values from the commonly accessible storage location once the synchronization circuit releases its hold on execution of processing;
a reader circuit in the second processor that reads into the second processor the first and second count values from the commonly accessible storage location once the synchronization circuit releases its hold on execution of processing;
the first store circuit in the first processor that stores the first processor's selected elements from its vector register into sequential locations in memory starting at a predetermined location; and
the second store circuit in the second processor that stores the second processor's selected elements from its vector register into sequential locations in memory starting at an offset from the predetermined location, wherein the offset is based on the first count value.

18. The apparatus of claim 17, wherein the synchronization circuit is further used to hold execution of further processing at a second point in execution in each of the plurality of participating processors until all participating processors have stored their respective selected elements into memory.

19. The apparatus of claim 17, further comprising:
a first register in the first processor that holds a first mask vector; and
a second register in the second processor that holds a second mask vector;
wherein the first mask vector indicates which elements in the first subset of the array are to be selected by the selection circuit, and the second mask vector indicates which elements in the second subset of the array are to be selected by the selection circuit.

20. A non-transitory computer-readable storage medium having executable instructions stored therein for causing a suitably programmed information-processing system to perform a method comprising:
reading a different subset of a source array into each one of a plurality of processors, the source array having one or more elements that meet a predetermined criteria and one or more elements that do not meet the predetermined criteria;
selecting a subset of elements within each processors' subset of the source array that meet the predetermined criteria;
counting each of the selected subsets of elements and storing the resulting count values in a commonly accessible storage location;
once all of the plurality of processors have stored their respective count values, reading into at least some of the plurality of processors at least one of the count values; and
at least in part based on the read count values, storing only the respective selected subset of elements by each one of the plurality of processors into successive portions of a pack array, wherein the pack array contains the one or more elements meeting the predetermined criteria and does not contain the one or more elements not meeting the predetermined criteria.

21. The computer-readable storage medium of claim 20, wherein the method further comprises:
after storing the count values performing a first synchronization operation that causes at least some of the plurality of processors to wait for all processors to perform their respective store of their count values before reading the count values.

22. The computer-readable storage medium of claim 20, wherein the method further comprises:
after storing respective selected elements, performing a second synchronization operation that causes at least some of the plurality of processors to wait for all processors to perform their respective read of the count values before proceeding to subsequent processing.

23. The computer-readable storage medium of claim 20, wherein the method further comprises:
in each processor, reading its respective allocated subset of the array into a vector register in the respective processor;
and wherein the selected subset of elements are indicated by bits in a mask vector, and wherein the mask vector is used in selecting elements for the storing of its respective subset of elements.

24. The computer-readable storage medium of claim 20, wherein the method further comprises:
iteratively performing a set of the operations.

25. The computer-readable storage medium of claim 20, wherein the method further comprises:
storing an offset count for the first element to be written to the pack array in a subsequent iteration; and
reading the offset count to determine where in the pack array to write the first element in the subsequent iteration.

* * * * *